(12) United States Patent
Aldridge et al.

(10) Patent No.: US 10,110,848 B2
(45) Date of Patent: *Oct. 23, 2018

(54) IMAGING AND DISPLAY SYSTEM AND METHOD

(71) Applicant: THE SUPERGROUP CREATIVE OMNIMEDIA, INC., Atlanta, GA (US)

(72) Inventors: John Gabriel Aldridge, College Park, GA (US); David Lee Sutton, Marietta, GA (US); John Michael Preziotti, Kennesaw, GA (US)

(73) Assignee: THE SUPERGROUP CREATIVE OMNIMEDIA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,749

(22) Filed: Oct. 4, 2017

(65) Prior Publication Data

US 2018/0027212 A1 Jan. 25, 2018

Related U.S. Application Data

(63) Continuation of application No. 15/174,085, filed on Jun. 6, 2016, now Pat. No. 9,819,903.

(Continued)

(51) Int. Cl.
*H04N 7/14* (2006.01)
*G02F 1/1333* (2006.01)
(Continued)

(52) U.S. Cl.
CPC ......... *H04N 7/144* (2013.01); *G02F 1/13338* (2013.01); *G02F 1/13362* (2013.01);
(Continued)

(58) Field of Classification Search
CPC .......... H04N 7/14; H04N 7/142; H04N 7/144; H04N 2007/145
(Continued)

(56) References Cited

U.S. PATENT DOCUMENTS 4,468,092 A   8/1984  Inoue et al.
4,708,435 A  11/1987  Yata et al.
(Continued)

FOREIGN PATENT DOCUMENTS

WO   0111880 A1   2/2001
WO   2010054779 A1  5/2010
WO   2011071700 A2  6/2011

OTHER PUBLICATIONS

Search Report for European Patent Application No. 14810967.1; dated Nov. 17, 2016.
(Continued)

*Primary Examiner* — Melur Ramakrishnaiah
(74) *Attorney, Agent, or Firm* — Barnes & Thornburg LLP; Jason Bernstein

(57) ABSTRACT

An apparatus for simultaneously recording a first live video stream and projecting a second live video stream onto an interactive touch screen, the apparatus comprising (a) a backlight panel; (b) a horizontally polarized screen associated with one face of the backlight panel; (c) a camera having a lens, the camera having controllable frame rate and exposure; and, (d) a LCD screen.

8 Claims, 1 Drawing Sheet

Related U.S. Application Data

(60) Provisional application No. 62/171,763, filed on Jun. 5, 2015.

(51) Int. Cl.
  *H04N 5/235* (2006.01)
  *G02F 1/1335* (2006.01)
  *H04N 5/77* (2006.01)
  *G02F 1/133* (2006.01)

(52) U.S. Cl.
  CPC ..... *G02F 1/133602* (2013.01); *H04N 5/2352* (2013.01); *H04N 5/2353* (2013.01); *H04N 5/77* (2013.01); *G02F 2001/13312* (2013.01)

(58) Field of Classification Search
  USPC .......................................... 348/14.01–14.16
  See application file for complete search history.

(56) References Cited

U.S. PATENT DOCUMENTS

| | | | |
|---|---|---|---|
| 4,729,631 A | 3/1988 | Takahashi et al. | |
| 5,400,069 A * | 3/1995 | Braun .................... | H04N 7/144 348/14.08 |
| 6,078,351 A | 6/2000 | Hall, Jr. et al. | |
| 6,144,797 A | 11/2000 | MacCormack et al. | |
| 6,550,521 B1 | 4/2003 | McNabb | |
| 6,774,912 B1 | 8/2004 | Ahmed et al. | |
| 6,814,443 B2 | 11/2004 | Safran et al. | |
| 6,829,086 B1 | 12/2004 | Gibilini | |
| 7,346,271 B2 | 3/2008 | Komi et al. | |
| 7,433,179 B2 | 10/2008 | Hisano et al. | |
| 8,035,624 B2 | 10/2011 | Bell et al. | |
| 8,250,617 B2 | 8/2012 | Hensgen et al. | |
| 8,298,081 B1 | 10/2012 | Merritt et al. | |
| 8,777,224 B2 | 7/2014 | Gadda et al. | |
| 8,921,473 B1 | 12/2014 | Hyman | |
| 9,214,098 B2 | 12/2015 | Carlsson et al. | |
| 9,609,265 B2 | 3/2017 | Lewis et al. | |
| 2005/0178823 A1 | 8/2005 | Kuwahara et al. | |
| 2006/0095340 A1 | 5/2006 | Iadanza et al. | |
| 2007/0186002 A1 | 8/2007 | Campbell et al. | |
| 2008/0043100 A1 | 2/2008 | Sobel et al. | |
| 2008/0052090 A1 | 2/2008 | Heinemann et al. | |
| 2008/0150890 A1 | 6/2008 | Bell et al. | |
| 2008/0152304 A1 | 6/2008 | Yoo et al. | |
| 2009/0049395 A1 | 2/2009 | Lee et al. | |
| 2009/0102763 A1 * | 4/2009 | Border .................... | H04N 7/144 345/87 |
| 2010/0007773 A1 | 1/2010 | O'Connell et al. | |
| 2010/0159874 A1 | 6/2010 | Lewis et al. | |
| 2010/0188478 A1 | 7/2010 | Robinson et al. | |
| 2010/0198400 A1 | 8/2010 | Pascal et al. | |
| 2010/0238265 A1 | 9/2010 | White | |
| 2010/0238341 A1 * | 9/2010 | Manico ................ | H04N 9/3141 348/333.01 |
| 2010/0259058 A1 | 10/2010 | Knighton et al. | |
| 2011/0102320 A1 | 5/2011 | Hauke et al. | |
| 2011/0112913 A1 | 5/2011 | Murray | |
| 2011/0164163 A1 | 7/2011 | Bilbrey et al. | |
| 2011/0184812 A1 | 7/2011 | Stoulil | |
| 2011/0207504 A1 | 8/2011 | Anderson et al. | |
| 2012/0200662 A1 | 8/2012 | Wu | |
| 2012/0206560 A1 | 8/2012 | Setton | |
| 2012/0229590 A1 | 9/2012 | Barrus | |
| 2012/0287223 A1 | 11/2012 | Zhang et al. | |
| 2012/0287321 A1 | 11/2012 | Border et al. | |
| 2013/0018735 A1 | 1/2013 | Walker et al. | |
| 2013/0043271 A1 | 2/2013 | South et al. | |
| 2013/0050573 A1 | 2/2013 | Syed et al. | |
| 2013/0120568 A1 | 5/2013 | Jensen, II | |
| 2013/0215214 A1 | 8/2013 | Dhopte et al. | |
| 2013/0326250 A1 | 12/2013 | Sullivan et al. | |
| 2014/0152584 A1 | 6/2014 | Matthews et al. | |
| 2014/0164927 A1 | 6/2014 | Salaverry et al. | |
| 2014/0369660 A1 | 12/2014 | Lewis et al. | |
| 2015/0042746 A1 | 2/2015 | Lewis et al. | |

OTHER PUBLICATIONS

International Preliminary Report on Patentability for International Patent Application No. PCT/US2014/042541, dated Dec. 23, 2015.
Search Report for International Patent Application No. PCT/US2014/042541, dated Dec. 11, 2014.
International Preliminary Report on Patentability for International Patent Application No. PCT/US2014/042544, dated Dec. 23, 2015.
Search Report for International Patent Application No. PCT/US2014/042544, dated Oct. 28, 2014.

* cited by examiner

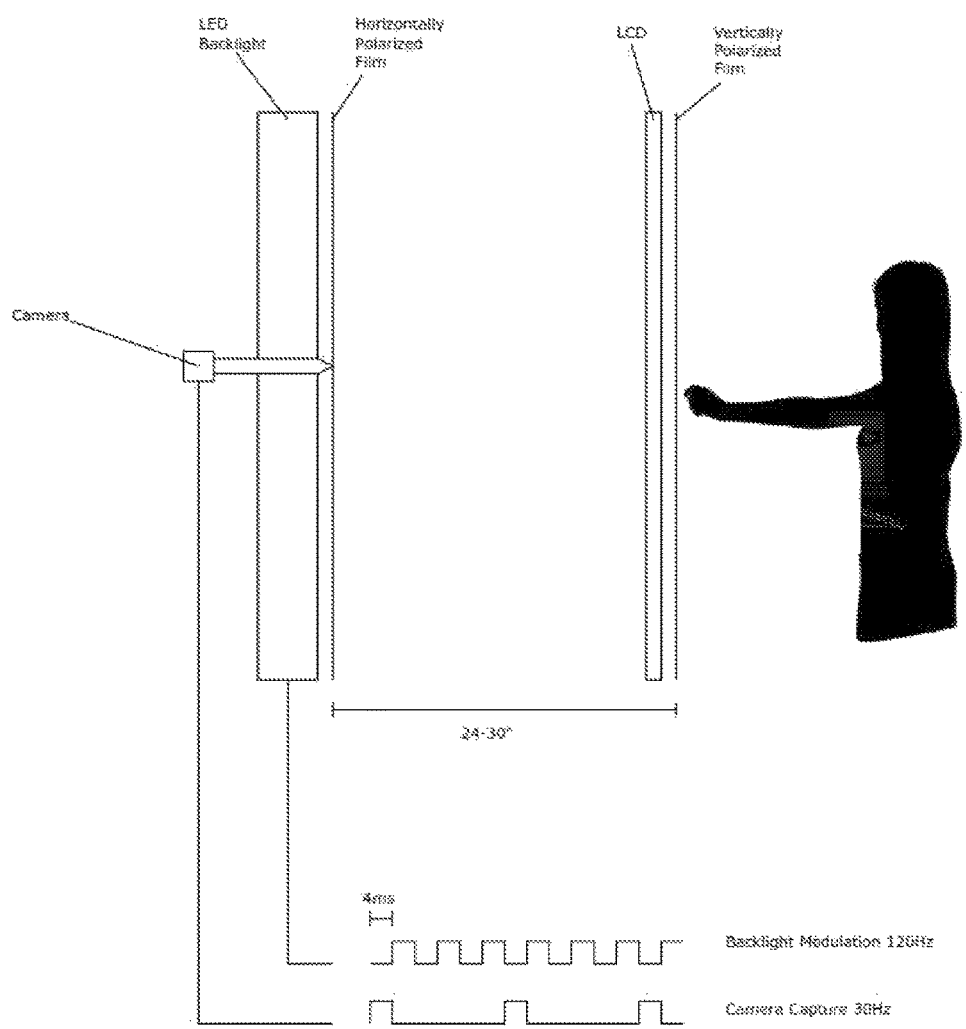

IMAGING AND DISPLAY SYSTEM AND METHOD

CROSS REFERENCE TO RELATED APPLICATIONS

This application is a continuation of U.S. patent application Ser. No. 15/174,085, filed Jun. 6, 2016, entitled Imaging and Display System and Method, which claims priority to U.S. Provisional Patent Application Ser. No. 62/171,763, filed Jun. 5, 2015, entitled Imaging and Display System and Method, the disclosures of which are incorporated herein by reference in their entireties.

FIELD

The present disclosure relates, in exemplary embodiments, to apparatus and methods for recording and projecting video images onto and through an interactive touch screen.

BACKGROUND

The present disclosure relates, in exemplary embodiments, to apparatus and methods for recording and projecting video images onto and through an interactive touch screen.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Generally described, the present disclosure provides in a first exemplary embodiment, an apparatus for simultaneously recording a first live video stream and projecting a second live video stream onto an interactive touch screen, the apparatus comprising (a) a backlight panel; (b) a horizontally polarized screen associated with one face of the backlight panel; (c) a camera having a lens, the camera having controllable frame rate and exposure; and, (d) a LCD screen.

The present disclosure also provides, in a second exemplary embodiment, a system for simultaneously recording a first live video stream and projecting a second live video stream onto an interactive touch screen, the system comprising: (a) a first apparatus comprising, (i) a first backlight panel, (ii) a first horizontally polarized screen associated with one face of the first backlight panel, (iii) a first camera having a lens, the camera having controllable frame rate and exposure, and, (iv) a first LCD screen; and further comprising (b) a second apparatus comprising (v) a second backlight panel, (vi) a second horizontally polarized screen associated with one face of the first backlight panel, (vii) a second camera having a lens, the camera having controllable frame rate and exposure, and, (viii) a second LCD screen.

BRIEF DESCRIPTION OF THE DRAWINGS

The drawings disclose exemplary embodiments in which like reference characters designate the same or similar parts throughout the figures of which:

FIG. 1 is a schematic view of one exemplary embodiment of an apparatus according to the present disclosure.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows an apparatus (and frequency modulation numbers) according to one exemplary embodiment. A first apparatus comprising a screen and a camera combination is set up at a first location (A) and a second apparatus comprising a similar screen and camera combination is set up at a second location (B). The camera at location (A) is fed to the screen in location (B) and vice versa via a wireless connection over a network, e.g., the internet.

A user at each location walks up to the screen at his/her location and observes the other person on the screen as if each was on either side of a virtual glass, sharing a coplanar line of sight. In addition, when each user places his/her hand on their respective screen, their hands appear to touch, as size and perspective are preserved.

In exemplary embodiments, each apparatus consists of a camera, LCD screen and a back light. In exemplary embodiments, the camera is of a type where frame rate and exposure can be externally controlled. In exemplary embodiments, the camera is a microscopy-type camera. In exemplary embodiments, the camera is a CCD camera Point Grey Dragonfly™, model BFLY-U3-13S2C-CS (available from Scientific).

In addition, the camera is equipped with a pinhole lens and mounted within the back light enclosure, exposing only the pinhole portion of the lens. The LCD screen is transparent or translucent and is mounted a correct distance in front of the camera and back light to preserve a perceived "arms-length" distance. In exemplary embodiments, such distance may be a range of 24-30 inches. It is to be understood that the distance can be adapted as needed. By having the camera shooting through the LCD screen which is "line-of-sight" and at perceived arms' length, users see one another as in normal conversation. Instead of appearing as if each one is looking "off camera" as with normal teleconferencing, their gaze is eye to eye. In exemplary embodiments, the back light is a panel with LED lights.

In order for a camera to shoot through a LCD screen without "seeing" the reverse image on the screen, the backside polarization layer is removed from the LCD screen. This allows the camera to view merely differing angles of polarization vis-a-vis the "twisting" action of the LCD matrix. As no oppositional polarization layer exists to reveal pixels, the camera only perceives transparency.

From the perspective of the viewer of the LCD screen on the opposing side, the viewer should also see nothing but transparency and no image as the polarization film is removed from the back side. The solution is to place the polarization film on the surface of the back light, which is at an "arms-length" distance from the camera. In exemplary embodiments, it is important that the polarization film covers all of the back light except the camera. The camera has an unimpeded view of the LCD screen.

In order for the camera to be able to capture through a ½ polarized LCD screen (i.e., polarized in only one direction), without the wash of reflected light from the back light hitting the back of the LCD screen, it is necessary to alternate the back light on/off and the camera capture at a rate where flicker is not noticeable. A micro-controller is used to generate two synchronized pulse width modulated signals where one signal modulates the back light at roughly 120 hz, while the other signal triggers a camera exposure of, in one exemplary embodiment, about 4 milliseconds every 33.33 milliseconds. The result is a camera that captures at a nominal 30 FPS frame rate, while the LCD screen image appears flicker-free.

The images or video stream from the apparatus at location (A) is transmitted to the apparatus at location (B) and fed into the onboard processor (which is part of each apparatus), which displays the stream onto the LCD screen of the apparatus at location (B).

The apparatus as described herein may be contained in a housing, with associated power source(s), controller, and connection to a second apparatus, e.g., an internet, WiFi or wired connection. In alternative embodiments, the signal from a first apparatus may communicate with a remote central computer, which itself is also in communication with a second apparatus. In exemplary embodiments, more than two apparatus can be used.

The following describes one exemplary embodiment of a method/sequence using apparatus as described herein.

An apparatus comprising a camera, a LED backlight having a horizontally polarized film associated with a front face (the backlight having a pinhole aperture defined therein), a camera, and LCD screen with a vertically polarized film associated with one face. The backlight and the LCD screen are positioned to be separated by about 24-30 inches. The camera lens is positioned to be approximately at the same location as the face of the backlight and/or horizontally polarized film. These components are mounted in a housing, along with the associated electronics.

At 0-4.166 milliseconds: The back light is off. The camera captures video through the LCD screen and vertically polarized film as the interior of the housing is in a dark state and reflection from the back of the LCD screen is eliminated.

At 4.16-8.33 milliseconds: The camera no longer captures video and the backlight projects through the horizontally polarized film, through the LCD screen, and through the vertically polarized film to display the image (as with any LCD screen technology).

At 8.33-33.33 milliseconds: Only the backlight modulates during this period, for a nominal frequency of 120 Hz, well above the eye's persistence of vision.

At 33.33-37.49 milliseconds: The cycle repeats. The backlight is off. The camera captures video through the LCD screen and vertically polarized film as the interior of the housing is in a dark state and reflection from the back of the LCD screen is eliminated.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be understood that the computer upon which the mobile application is running may be coupled to a plurality of communication channels that allow the computer to communicate with other computing devices, e.g., servers, processors, etc. over, for example, one or more communication networks. As such, it should be understood that communication channels are examples of communications media, which typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Further, the present method and system may also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

The following numbered clauses include embodiments that are contemplated and non-limiting:

Clause 1. An apparatus for simultaneously recording a first live video stream and projecting a second live video stream onto an interactive touch screen, the apparatus comprising: (a) a backlight panel; (b) a horizontally polarized screen associated with one face of the backlight panel; (c) a camera having a lens, the camera having controllable frame rate and exposure; and, (d) a LCD screen.

Clause 2. The apparatus of Clause 1, further comprising a processor.

Clause 3. The apparatus of Clause 1, further comprising a receiver for wirelessly transmitting and receiving data.

Clause 4. A system for simultaneously recording a first live video stream and projecting a second live video stream onto an interactive touch screen, the system comprising: (a) a first apparatus comprising, (i) a first backlight panel, (ii) a first horizontally polarized screen associated with one face of the first backlight panel, (iii) a first camera having a lens, the camera having controllable frame rate and exposure, and, (iv) a first LCD screen; and further comprising (b) a second apparatus comprising (v) a second backlight panel, (vi) a second horizontally polarized screen associated with one face of the first backlight panel, (vii) a second camera having a lens, the camera having controllable frame rate and exposure, and, (viii) a second LCD screen.

It should further be noted that any patents, applications and publications referred to herein are incorporated by reference in their entirety.

What is claimed is:

1. A method for simultaneously recording a first live video stream and projecting a second live video stream onto an interactive touch screen comprising:
    a) providing a backlight panel with a horizontally polarized screen on one face of the backlight panel, the backlight panel switchable between an on mode and an off mode;
    b) providing an LCD screen having a polarization layer on the front side of the LCD screen, wherein the LCD screen polarization layer is oppositional to the backlight panel polarization screen;
    c) positioning the LCD screen in front of a camera;
    d) capturing by the camera through the backlight polarization screen an image through the LCD screen and vertically polarized film at a first time with the backlight off; and
    e) projecting the backlight through the horizontally polarized film, the LCD screen and the vertically polarized film to display an image at a second time with the backlight on.

2. The method of claim 1 further comprising:
    with a controller generating two synchronized pulse width modulated signals wherein one synchronized signal modulates the back light and the other synchronized signal modulates a camera exposure time, wherein the synchronized signals provide a flicker-free image.

3. The method of claim 1 wherein data to perform at least one of the method steps are transmitted and received wirelessly.

4. The method of claim 1 further comprising transmitting the image to a first location to be displayed on the LCD screen.

5. The method of claim 1 further comprising:
    at a second location with a second backlight panel with a horizontally polarized screen on one face of the second backlight panel, wherein the second backlight panel is switchable between an on mode and an off mode, and a second LCD screen having a polarization layer on the front side of the second LCD screen, wherein the second LCD screen polarization layer is oppositional to the second backlight panel polarization screen:
    a) capturing by a second camera an image through the second LCD screen and vertically polarized film at a first time with the backlight off; and
    b) projecting the backlight through the horizontally polarized film, the second LCD screen and the vertically polarized film to display a second image at a second time with the backlight on.

6. The method of claim 5 further comprising:
    with a controller generating two synchronized pulse width modulated signals wherein one synchronized signal modulates the backlight and the other synchronized signal modulates a camera exposure time, wherein the synchronized signals provide a flicker-free image.

7. The method of claim 6 further comprising:
    with a second controller generating two synchronized pulse width modulated signals wherein one synchronized signal modulates the second backlight and the other synchronized signal modulates an exposure time of the second camera, wherein the synchronized signals provide a second flicker-free image.

8. The method of claim 5 wherein data to perform at least one of the method steps are transmitted and received wirelessly.

* * * * *